United States Patent [19]

Atmur et al.

[11] Patent Number: 5,692,373

[45] Date of Patent: Dec. 2, 1997

[54] EXHAUST MANIFOLD WITH INTEGRAL CATALYTIC CONVERTER

[75] Inventors: Steven Donald Atmur, Riverside; Thomas Edward Strasser, Corona, both of Calif.

[73] Assignee: Northrop Grumman Corporation, Los Angeles, Calif.

[21] Appl. No.: 515,548

[22] Filed: Aug. 16, 1995

[51] Int. Cl.⁶ .................. F01N 7/10; F01N 3/28
[52] U.S. Cl. .................. 60/274; 60/302; 60/323
[58] Field of Search .............. 60/302, 323, 274, 60/299

[56] References Cited

U.S. PATENT DOCUMENTS

| | | |
|---|---|---|
| 3,807,173 | 4/1974 | Zmuda ........................ 60/302 |
| 3,880,969 | 4/1975 | Latos . |
| 4,067,829 | 1/1978 | Garrett . |
| 4,206,598 | 6/1980 | Rao et al. . |
| 4,207,660 | 6/1980 | Rao et al. . |
| 4,233,361 | 11/1980 | Fultz . |
| 4,245,611 | 1/1981 | Mitchell et al. . |
| 4,294,788 | 10/1981 | Laskow et al. . |
| 4,311,541 | 1/1982 | Fultz . |
| 4,341,826 | 7/1982 | Prewo et al. . |
| 4,606,434 | 8/1986 | Vasilow et al. . |
| 4,657,951 | 4/1987 | Takarada et al. . |
| 4,818,732 | 4/1989 | Fox et al. . |
| 4,884,400 | 12/1989 | Tanaka et al. . |
| 4,887,518 | 12/1989 | Hayakawa . |
| 4,928,645 | 5/1990 | Berneburg et al. . |
| 4,972,674 | 11/1990 | Yamada et al. . |
| 4,981,820 | 1/1991 | Renlund et al. . |
| 5,000,136 | 3/1991 | Hansen et al. . |
| 5,018,661 | 5/1991 | Cyb . |
| 5,063,881 | 11/1991 | Kawamura . |
| 5,094,200 | 3/1992 | Fontichiaro . |
| 5,114,262 | 5/1992 | Kojima . |
| 5,126,087 | 6/1992 | Lespade et al. . |
| 5,137,789 | 8/1992 | Kaushal . |
| 5,140,813 | 8/1992 | Whittenberger . |
| 5,180,694 | 1/1993 | Renlund et al. . |
| 5,198,519 | 3/1993 | Mosher ........................ 528/28 |
| 5,203,228 | 4/1993 | Miyawaki et al. . |
| 5,224,335 | 7/1993 | Yoshizaki . |
| 5,224,572 | 7/1993 | Smolen, Jr. et al. . |
| 5,225,283 | 7/1993 | Leung et al. . |
| 5,231,059 | 7/1993 | Leung et al. . |
| 5,244,720 | 9/1993 | Leung et al. . |
| 5,258,084 | 11/1993 | Leung et al. . |
| 5,404,721 | 4/1995 | Hartsock . |

FOREIGN PATENT DOCUMENTS

| | | | |
|---|---|---|---|
| 1402714 | 8/1975 | United Kingdom ............ 60/302 |
| 2000046 | 1/1979 | United Kingdom ............ 60/302 |
| 2245506 | 1/1992 | United Kingdom ............ 60/302 |

*Primary Examiner*—Douglas Hart
*Attorney, Agent, or Firm*—Terry J. Anderson; Karl J. Hoch, Jr.

[57] ABSTRACT

A pollutant reducing exhaust manifold for an internal combustion engine incorporating a catalytic converter therein. The manifold has a plurality of header pipes connected to and receiving exhaust gases from respective ones of a plurality of exhaust ports of an internal combustion engine. The header pipes are connected to a single chamber with an outlet therefrom connected to an exhaust pipe as well as a catalytic converter structure having a catalyst disposed on a supporting substrate disposed in the chamber between the inlet(s) and the outlet so that all exhaust gases from the engine must pass through the catalytic converter structure. The catalytic converter operates at higher temperatures for increased efficiency and comes to operating temperature virtually immediately.

9 Claims, 2 Drawing Sheets

EXHAUST MANIFOLD WITH INTEGRAL CATALYTIC CONVERTER

BACKGROUND OF THE INVENTION

1. Technical Field

This invention relates to methods and apparatus for removing pollutants from the exhaust emissions of internal combustion engines and, more particularly, to a pollutant reducing exhaust manifold for an internal combustion engine comprising, a plurality of header pipes connected to and receiving exhaust gases from respective ones of a plurality of exhaust ports of the engine; a catalytic chamber having inlet(s) connected to receive exhaust gases from the plurality of header pipes and an outlet therefrom connected to an exhaust system; and, a catalytic converter structure having a catalyst disposed on a supporting substrate disposed in the catalytic chamber between the inlet(s) and the outlet so that all exhaust gases from the engine must pass through the catalytic converter structure.

2. Background Art

For many years, the exhaust systems of automobiles and other vehicles powered by internal combustion engines have remained substantially unchanged. There is an exhaust manifold that collects the exhaust gases emitted from the exhaust ports of the engine and outputs them into an exhaust pipe which conducts the gases to the rear of the automobile. Typically, a muffler is disposed in-line with the exhaust pipe to muffle the sounds of the gases to an acceptable level. More recently (after 1974 in the United States), modern exhaust systems have included a catalytic converter to remove emitted pollutants from the exhaust gases. A typical prior art exhaust system of such design is depicted in FIG. 1. The exhaust manifold 10 is bolted or clamped to the engine (not shown) with the flanges 12. The catalytic converter 14 is positioned in-line in the exhaust pipe 16, typically some two to ten feet from the manifold 10. The muffler 18 is typically located at the rear of exhaust system.

The above-described placement of the catalytic converter 14 creates several problems completely contrary to the intent thereof which is to reduce pollutants. Once it is operational, it works fairly well for its intended purpose. Because of its placement, however, it does not work as well as it could and, moreover, until it attains its operating temperature, it does not work at all. A catalytic converter is nothing more than a catalyst disposed on a substrate. When hot enough, the catalyst causes the unburned pollutants to be further oxidized. Until that time, the pollutants pass through unaffected. Since it is placed well down the exhaust pipe 16, when the engine is started the catalytic converter 14 is cold. And, it takes time for heat to build up in the catalytic converter 14 to a sufficient level that it begins to work. Unfortunately, starting is the time when the most pollutants are produced since a choke or similar mechanism typically increases the fuel-to-air ratio to enhance the combustion process in a cold engine. Thus, the partially burned fuel products pass virtually unhindered into the atmosphere. When one considers the number of engines started in a cold condition in a major city on any normal day, it can be seen that there are a lot of unburned pollutants poured into the atmosphere each and every day.

It has been suggested to add a heating element to the catalytic converter to get it to operating temperature more quickly; but, that is a stop-gap measure that is not overly effective. Typically, a operator expects his/her vehicle to start immediately when the ignition key is turned and will object if he/she must wait until the catalytic converter warms up before the engine will start. Like the bell or other alarm that warns that the seatbelt is not fastened, if a car will not start until the catalytic converter reaches temperature, based on human nature and prior experience many drivers will simply have their vehicles modified to bypass that feature, thereby eliminating the results intended to be attained thereby.

Wherefore, it is an object of the present invention to provide a catalytic converter which begins effective operation virtually immediately.

It is another object of the present invention to provide a catalytic converter which is highly effective in eliminating pollutants from exhaust gases.

Other objects and benefits of this invention will become apparent from the description which follows hereinafter when read in conjunction with the drawing figures which accompany it.

SUMMARY OF THE DISCLOSURE

The foregoing objects have been achieved in an exhaust manifold for an internal combustion engine having a plurality of header pipes connected to and receiving exhaust gases from respective ones of a plurality of exhaust ports of the engine and a single chamber inlet(s) connected to the plurality of header pipes and an outlet connected to an exhaust system, by the improvement of the present invention for reducing pollutants emitted by the engine comprising disposing a catalytic chamber between the inlet(s) and outlet thereof and disposing a catalytic converter structure having a catalyst disposed on a supporting substrate in the catalytic chamber between the inlet(s) and the outlet so that all exhaust gases from the engine must pass through the catalytic converter structure.

Preferably, the plurality of header pipes and the catalytic chamber are of a structural fiber reinforced ceramic matrix composite (FRCMC) material comprising fibers of a generic fiber system disposed throughout a pre-ceramic resin in its ceramic state. The preferred pre-ceramic resin comprises either a polymer-derived ceramic resin such as Silicon-Carboxyl or Alumina Silicate resins or a cementatous resin that has been modified to emulate polymer composite processing techniques such as Monoaluminum Phosphate (AKA Monoalumino Phosphate) resin; and, the preferred generic fiber system comprises Alumina, Altex, Nextel 312, Nextel 440, Nextel 510, Nextel 550, Silicon Nitride, Silicon Carbide, HPZ, Graphite, Carbon, and Peat The preferred supporting catalyst substrate is an open cell Silicon Carbide foam, Silicon Carboxyl foam, Oxide Ceramic foam, or similar ceramic foam material.

DETAILED DESCRIPTION OF THE PREFERRED EMBODIMENT

In a co-pending application entitled FIBER REINFORCED CERAMIC MATRIX COMPOSITE INTERNAL COMBUSTION ENGINE EXHAUST MANIFOLD by the inventors, herein Ser. No. 08/515,925 filed on Aug. 16, 1995 and assigned to the common assignee of this application, an improved structural fiber reinforced ceramic matrix composite material is disclosed having high breakage resistance, high temperature resistance, corrosion resistance, low heat rejection, and "tailorable" thermal expansion characteristics which makes it particularly suited for an exhaust manifold material for an internal combustion engine. The present invention is particularly intended for use with that manifold design as the catalytic converter substrate can be co-cured with the manifold itself. Additionally in the previously mentioned ceramic manifold invention, an expendable mandrel is employed to form the inner contours of the FRCMC exhaust manifold structure and, as described therein, by employing the present invention herein described the expendable mandrel can be eliminated and be replaced by the catalytic converter substrate material which acts as an internal tool during the forming process of the FRCMC manifold structure.

Figure 1:
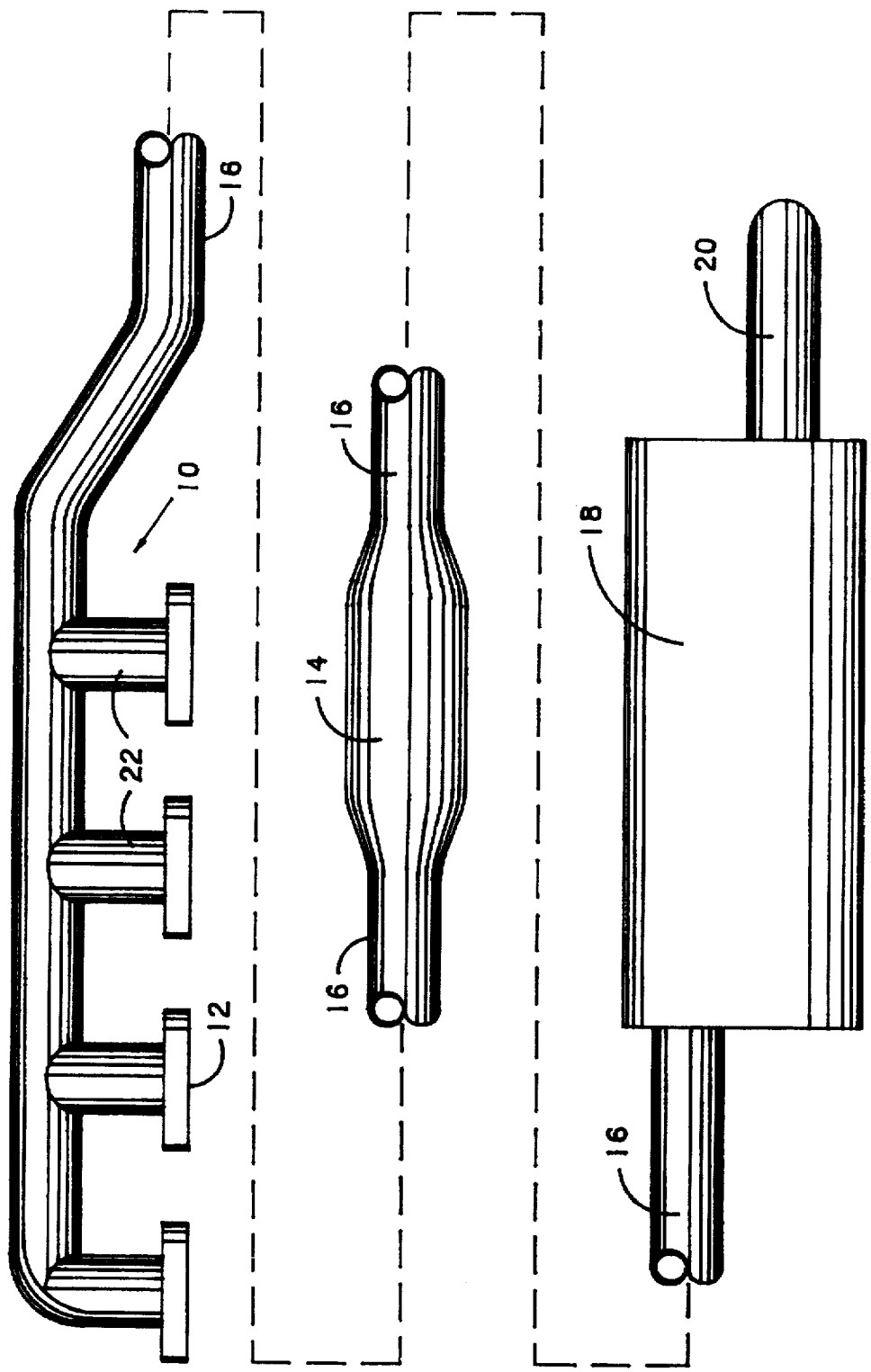
FIG. 1 is a simplified drawing of the components of a prior art exhaust system employing a catalytic converter.
Figure 2:
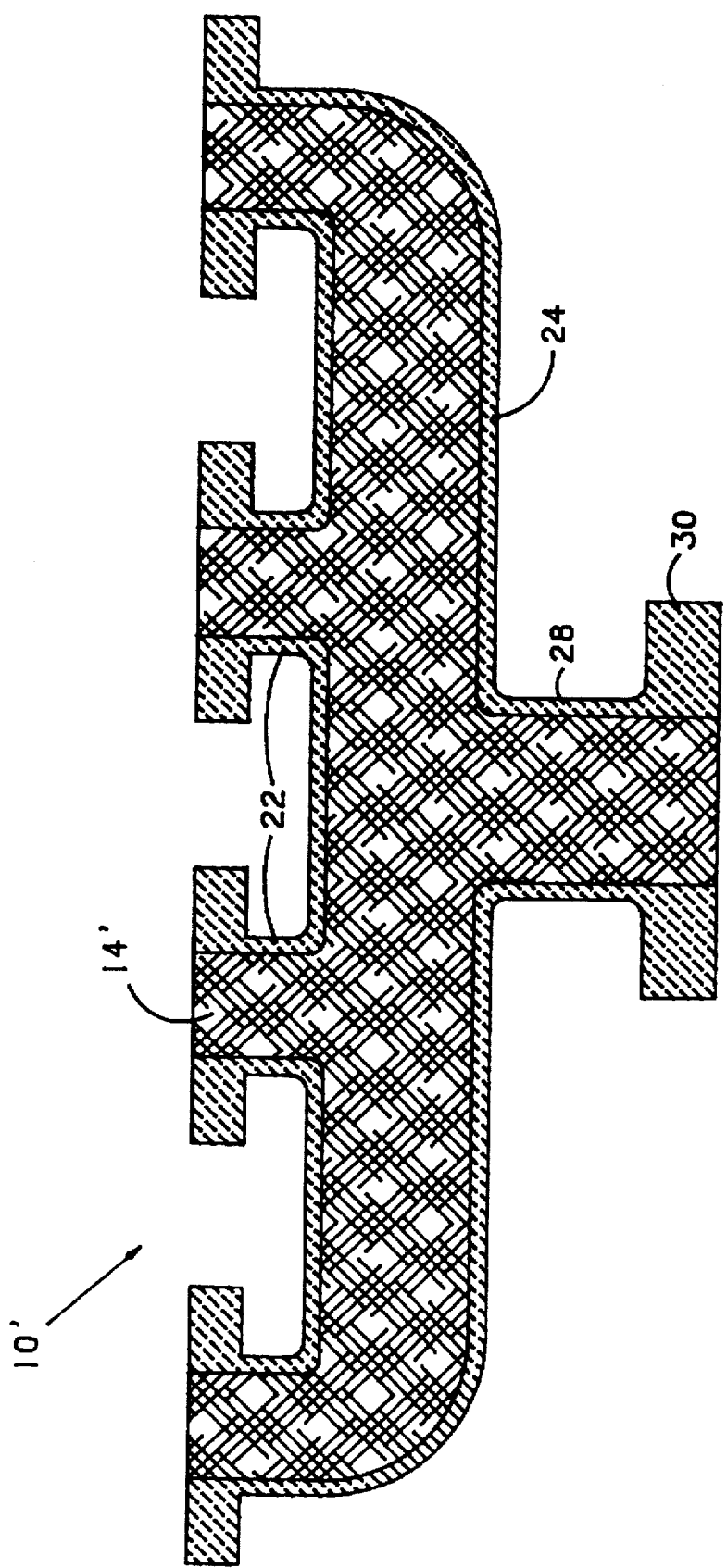
FIG. 2 is a simplified, partially cutaway drawing of an exhaust manifold according to the present invention incorporating a catalytic converter therein.

As depicted in FIG. 2, in the present invention the catalytic converter substrate material 14' is incorporated directly into the exhaust manifold 10'. The header pipes 22, chamber 24, and single connecting pipe 28 all contain the catalytic substrate and therefore, act as the catalytic converter chamber. The outlet 30 is the outlet of the manifold 10' to which the standard exhaust pipe 16 of FIG. 1 is connected. Thus, all the hot exhaust gases from the engine immediately impinge on and pass through the catalytic substrate 26 to be cleaned thereby. Not only are the gases hotter than in a conventional prior art catalytic converter; but, additionally, the catalytic substrate 26 of this invention achieves sufficient operating temperature almost immediately because of the heat insulating/containment effect of the outer FRCMC structure that is inherently low thermal conductivity and low specific heat capacity.

While any structure capable of withstanding the temperatures involved may be employed for the manifold 10' of this invention, an all-ceramic structure as described in the co-pending application entitled FIBER REINFORCED CERAMIC MATRIX COMPOSITE INTERNAL COMBUSTION ENGINE EXHAUST MANIFOLD by the inventors herein Ser. No. 08/515,925, filed on Aug. 16, 1995, herewith and assigned to the common assignee of this application is preferred. Thus, it is preferred that the header pipes 22, the chamber 24, the connecting pipe 28, and the outlet 30 be of a fiber reinforced ceramic matrix composite (FRCMC) material comprising a pre-ceramic resin having fibers of a generic fiber system disposed throughout.

The preferred FRCMC material used in this invention employs either polymer derived ceramic resins commercially available such as Silicon-Carboxyl resin (sold by Allied-Signal under the trade name Blackglas), Alumina Silicate resin (sold by Applied Poleramics under the product designation CO2) or cementatous resins that have been modified to emulate polymer composite processing techniques such as Monoaluminum Phosphate (also known as Monoalumino Phosphate) resin combined with a generic fiber system such as, but are not limited to, Alumina, Altex, Nextel 312, Nextel 440, Nextel 510, Nextel 550, Silicon Nitride, Silicon Carbide, HPZ, Graphite, Carbon, and Peat. To add toughness qualities to the material, the fiber system is first coated to a few microns thickness with an interface material such as Carbon, Silicon Nitride, Silicon Carbide, Silicon Carboxide, Boron Nitride or multiple layers of one or more of these interfacial materials. The interface material prevents the resin from adhering directly to the fibers of the fiber system. Thus, after the resin has been converted to a ceramic as per the resin manufacturer's recommended cure cycle, there is a weak interface between the ceramic matrix and the fibers thereby imparting the desired qualities to the final component. Additionally, while any type of structure capable of withstanding the temperatures involved can be employed for the catalytic converter substrate 26, a high temperature resistant foam structure such as a Silicon Carbide, Silicon Carboxyl, or an equivalent oxide ceramic foam is preferred due to it's high surface area to volume ratio and low specific heat capacity.

Wherefore, having thus described the present invention, what is claimed is:

1. A pollutant reducing exhaust manifold for an internal combustion engine comprising:
   a) a plurality of header pipes connected to and receiving exhaust gases from respective ones of a plurality of exhaust ports of the engine;
   b) a catalytic chamber having at least one inlet connected to receive exhaust gases from said plurality of header pipes and an outlet therefrom connected to an exhaust pipe;
   c) a catalytic converter structure having a catalyst disposed on a supporting substrate disposed in said catalytic chamber between said at least one inlet and said outlet so that all exhaust gases from the engine must pass through said catalytic converter structure; and,
   d) wherein said plurality of header pipes and said catalytic chamber are of a structural fiber reinforced ceramic matrix composite material comprising fibers of a generic fiber system disposed throughout a pre-ceramic resin in its ceramic state.

2. The pollutant-reducing exhaust manifold of claim 1 wherein:
   a) said pre-ceramic resin comprises silicon-carboxyl resin, alumina silicate or monoaluminum phosphate resin; and,
   b) said generic fiber system comprises alumina, Altex, Nextel 312, Nextel 440, Nextel 510, Nextel 550, silicon nitride, silicon carbide, HPZ, graphite, carbon, and peat.

3. The pollutant-reducing exhaust manifold of claim 1 wherein:
   said catalyst supporting substrate is a high temperature resistant foam material.

4. The pollutant-reducing exhaust manifold of claim 3 wherein:
   said foam material comprises silicon carbide, silicon carboxyl or an equivalent oxide ceramic foam.

5. A method of maximizing the elimination of unburned pollutants from an internal combustion engine exhaust comprising the steps of:
   a) receiving hot exhaust gases from a plurality of exhaust ports of the engine;
   b) immediately directing all the hot exhaust gases into a chamber made of a structural fiber reinforced ceramic matrix composite material comprising fibers of a generic fiber system disposed throughout a pre-ceramic resin in its ceramic state and connected to the exhaust ports and containing a catalyst on a substrate; and,
   c) directing all the hot exhaust gases over the catalyst and out a single outlet of the chamber into an exhaust system.

6. In an exhaust manifold for an internal combustion engine having a plurality of header pipes connected to and receiving exhaust gases from respective ones of a plurality of exhaust ports of the engine and a single chamber connected to the plurality of header pipes and an outlet connected to an exhaust system, the improvement for reducing pollutants emitted by the engine comprising:

disposing a catalytic converter structure having a catalyst disposed on a supporting substrate in said catalytic chamber between at least one inlet and said outlet so that all exhaust gases from the engine must pass through said catalytic converter structure; and providing said plurality of header pipes and said catalytic chamber as a structural fiber reinforced ceramic matrix composite material comprising fibers of a generic fiber system disposed throughout a pre-ceramic resin in its ceramic state.

7. The improvement to an exhaust manifold of claim 6 wherein:

a) said pre-ceramic resin comprises polymer derived ceramic resins including silicon-carboxyl, alumina silicate resin and cementatous resins modified to emulate polymer composite processing techniques including monoaluminum phosphate resin; and, b) said generic fiber system comprises alumina, Altex, Nextel 312, Nextel 440, Nextel 510, Nextel 550, silicon nitride, silicon carbide, HPZ, graphite, carbon, and peat.

8. The improvement to an exhaust manifold of claim 6 wherein:

said supporting substrate is a ceramic foam material.

9. The improvement to an exhaust manifold of claim 8 wherein:

said foam material comprises silicon carbide, silicon carboxyl or an equivalent oxide ceramic foam.

* * * * *